(12) United States Patent
Naik et al.

(10) Patent No.: US 7,831,369 B2
(45) Date of Patent: Nov. 9, 2010

(54) METHOD AND APPARATUS FOR VEHICLE AND ENGINE OPERATION

(75) Inventors: Sanjeev M. Naik, Troy, MI (US); Man-Feng Chang, Troy, MI (US); Jeffrey T. Wolak, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 858 days.

(21) Appl. No.: 11/554,736

(22) Filed: Oct. 31, 2006

(65) Prior Publication Data

US 2007/0112494 A1     May 17, 2007

Related U.S. Application Data

(60) Provisional application No. 60/737,203, filed on Nov. 16, 2005.

(51) Int. Cl.
*B60T 7/12* (2006.01)

(52) U.S. Cl. .............. 701/96; 701/55; 701/36; 701/300; 73/178 R; 340/435; 342/70; 342/71

(58) Field of Classification Search ............ 701/1, 701/55, 101, 200, 96, 93, 300, 36; 73/178 R; 340/435; 342/70–71
See application file for complete search history.

(56) References Cited

U.S. PATENT DOCUMENTS

| | | | | |
|---|---|---|---|---|
| 4,887,223 A * | 12/1989 | Christian | ............ | 382/153 |
| 5,179,441 A * | 1/1993 | Anderson et al. | ............ | 348/43 |
| 5,684,696 A * | 11/1997 | Rao et al. | ............ | 701/25 |
| 5,925,080 A * | 7/1999 | Shimbara et al. | ............ | 701/23 |
| 5,957,983 A * | 9/1999 | Tominaga | ............ | 701/23 |
| 5,961,559 A * | 10/1999 | Shimbara et al. | ............ | 701/23 |
| 6,115,652 A * | 9/2000 | Sato et al. | ............ | 701/28 |
| 6,138,062 A * | 10/2000 | Usami | ............ | 701/23 |
| 6,347,608 B1 | 2/2002 | Hara et al. | | |
| 6,370,471 B1 * | 4/2002 | Lohner et al. | ............ | 701/96 |
| 6,681,170 B2 * | 1/2004 | Winner et al. | ............ | 701/93 |
| 6,934,613 B2 * | 8/2005 | Yun | ............ | 701/41 |
| 6,945,346 B2 * | 9/2005 | Massen | ............ | 180/170 |
| 6,970,777 B2 * | 11/2005 | Tange et al. | ............ | 701/41 |

(Continued)

FOREIGN PATENT DOCUMENTS

EP    1103023 A2 *   5/2001

(Continued)

OTHER PUBLICATIONS

Experimental Characterization of a Supercapacitor-Based Electrical Torque-Boost System for Downsized ICE Vehicles Jiabin Wang et al..; Vehicular Technology, IEEE Transactions on; vol. 56 , Issue: 6 , Part: 2; Digital Object Identifier: 10.1109/TVT.2007.901885; Publication Year: 2007 , pp. 3674-3681.*

(Continued)

*Primary Examiner*—Cuong H Nguyen

(57) ABSTRACT

There is provided a method and executable code for controlling operation of a vehicle. The vehicle control occurs during ongoing operation subsequent to deactivating an internal combustion engine which is effective to generate vehicle tractive torque. The method comprises: monitoring conditions external to the vehicle, and, restarting the internal combustion engine when the monitored external conditions indicate an imminent opportunity to move the vehicle in a forward direction.

18 Claims, 4 Drawing Sheets

U.S. PATENT DOCUMENTS

| | | | |
|---|---|---|---|
| 7,117,077 B2 * | 10/2006 | Michi et al. | 701/96 |
| 7,265,510 B2 * | 9/2007 | Braeuchle et al. | 318/580 |
| 7,454,291 B2 * | 11/2008 | Kawakami et al. | 701/301 |
| 7,617,037 B2 * | 11/2009 | Desens et al. | 701/96 |
| 2003/0014176 A1 | 1/2003 | Levine | |

FOREIGN PATENT DOCUMENTS

| | | | |
|---|---|---|---|
| EP | PCT/EP02/13546 | * | 6/2003 |
| JP | 8-056184 | * | 3/1996 |
| JP | 8-134485 | * | 3/1996 |
| JP | 2004-163420 | * | 6/2004 |
| WO | WO 0062139 A2 | * | 10/2000 |
| WO | WO03/039902 | * | 5/2003 |

OTHER PUBLICATIONS

System Modeling and Simulation as a Tool for Developing a Vision for Future Hybrid Electric Vehicle Drivetrain Configurations Doerffel, D.; Abu Sharkh, S.; Vehicle Power and Propulsion Conference, 2006. VPPC '06. IEEE; Digital Object Identifier: 10.1109/VPPC.2006.364315 ; Publication Year: 2006 , pp. 1-6.*

System optimization in the control of heavy duty vehicle braking sub-systems; Haijun Fang et al.; Decision and Control, 2009 held jointly with the 2009 28th Chinese Control Conference. CDC/CCC 2009. Proceedings of the 48th IEEE Conference on Digital Object Identifier: 10.1109/CDC.2009.5400426; Publication Year: 2009.*

Improving Transient Performance of Automated Convoy Vehicles using Command Shaping; Miller, K.M. et al.; System Theory, 2008. SSST 2008. 40th Southeastern Symposium on; Digital Object Identifier: 10.1109/SSST.2008.4480199; Publication Year: 2008 , pp. 103-107.*

Active Deceleration Support in Car Following; Mulder, M. et al.; Systems, Man and Cybernetics, Part A: Systems and Humans, IEEE Transactions on; vol. PP , Issue: 99; Digital Object Identifier: 10.1109/TSMCA.2010.2044998; Publication Year: 2010 , pp. 1-14.*

Motivation for continuous haptic gas pedal feedback to support car following; Abbink, D.A. et al.; Intelligent Vehicles Symposium, 2008 IEEE; Digital Object Identifier: 10.1109/IVS.2008.4621325; Publication Year: 2008 , pp. 283-290.*

Command Shaping for Automated Convoy Vehicles; Robertson, M.J.; System Theory, 2007. SSST '07. Thirty-Ninth Southeastern Symposium on; Digital Object Identifier: 10.1109/SSST.2007.352323; Publication Year: 2007 , pp. 85-89.*

Haptic car-following support with deceleration control; Mulder, M. et al..; Systems, Man and Cybernetics, 2009. SMC 2009. IEEE International Conference on; Digital Object Identifier: 10.1109/ICSMC.2009.5346803; Publication Year: 2009 , pp. 1686-1691.*

* cited by examiner

US 7,831,369 B2

METHOD AND APPARATUS FOR VEHICLE AND ENGINE OPERATION

CROSS-REFERENCE TO RELATED APPLICATIONS

This application claims the benefit of U.S. Provisional Application No. 60/737,203 filed Nov. 16, 2005, entitled METHOD AND APPARATUS FOR VEHICLE ENGINE STOP-START OPERATION.

TECHNICAL FIELD

This invention pertains generally to vehicle control systems, and more specifically to engine stop/start operation on a vehicle.

BACKGROUND OF THE INVENTION

There is an ongoing need to improve fuel economy, reduce consumption of fuel, and reduce emissions in modern vehicles. Hybrid powertrain systems, including belt-alternator-starter (BAS) systems, electro-mechanical drive and electro-hydraulic drive systems are proposed to manage vehicle propulsion and minimize fuel consumption. One control scheme used in hybrid powertrain systems to improve fuel economy is commonly referred to as engine start/stop. Engine start/stop systems typically comprise deactivating or turning off the internal combustion engine under specific conditions during ongoing vehicle operation. Such specific conditions include idle periods at stop lights, and during stop-and-go traffic. Engine start/stop systems have delayed response times which limit their acceptability. Response time issues arise when an operator commands a stopped vehicle to proceed, through an action including depressing an accelerator pedal. At such time, the operator desires immediate responsiveness from the vehicle, vehicle launch may require that the engine be cranked and started prior to providing tractive torque to the vehicle wheels. The time to crank and start the engine can comprise several seconds. This operation is shown with regard to FIG. 2, wherein there is an extended period of time from when a lead vehicle increases speed from standstill until the operator detects such movement, releases the brake, manipulates an accelerator pedal, thus starting the engine and effecting forward vehicle motion.

Therefore, there is a need for an engine start/stop system for a vehicle powertrain which improves responsiveness, especially upon restarting of the engine, to better control forward motion of the vehicle during specific conditions defined by vehicle operating conditions, and traffic and road conditions.

SUMMARY OF THE INVENTION

In accordance with an embodiment of the invention, there is provided a method, preferably executed as executable code in an electronic control module, for controlling operation of a vehicle. The vehicle control occurs during ongoing operation subsequent to deactivating an internal combustion engine. The method comprises: monitoring conditions external to the vehicle, and, restarting the internal combustion engine when the monitored external conditions indicate an imminent opportunity to move the vehicle in a forward direction.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, embodiments of which is be described in detail and illustrated in the accompanying drawings which form a part hereof, and wherein.

DETAILED DESCRIPTION OF THE PREFERRED EMBODIMENT

Figure 1:
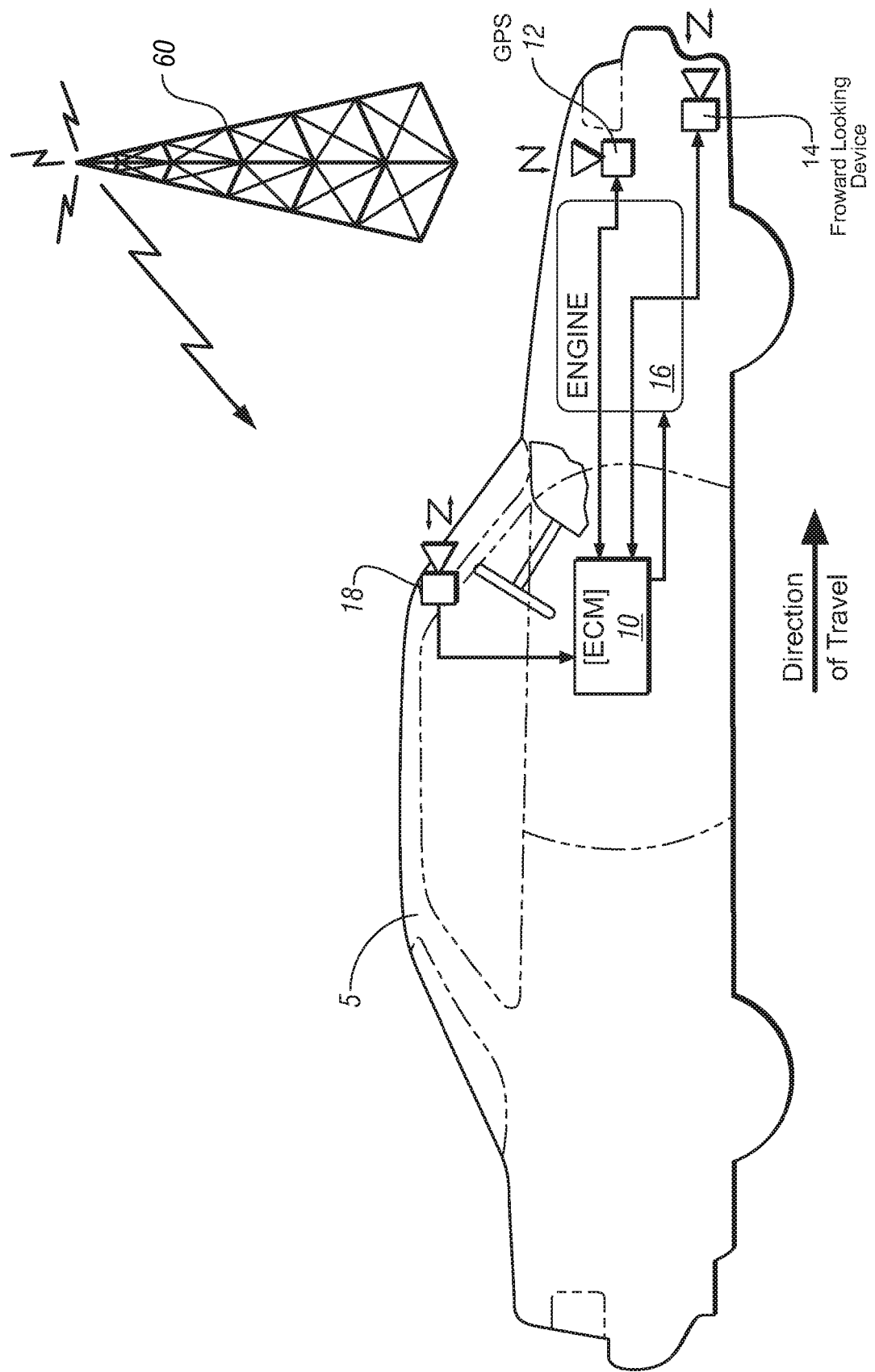
FIG. 1 is a schematic diagram of a vehicle, in accordance with the present invention.
Figure 2:
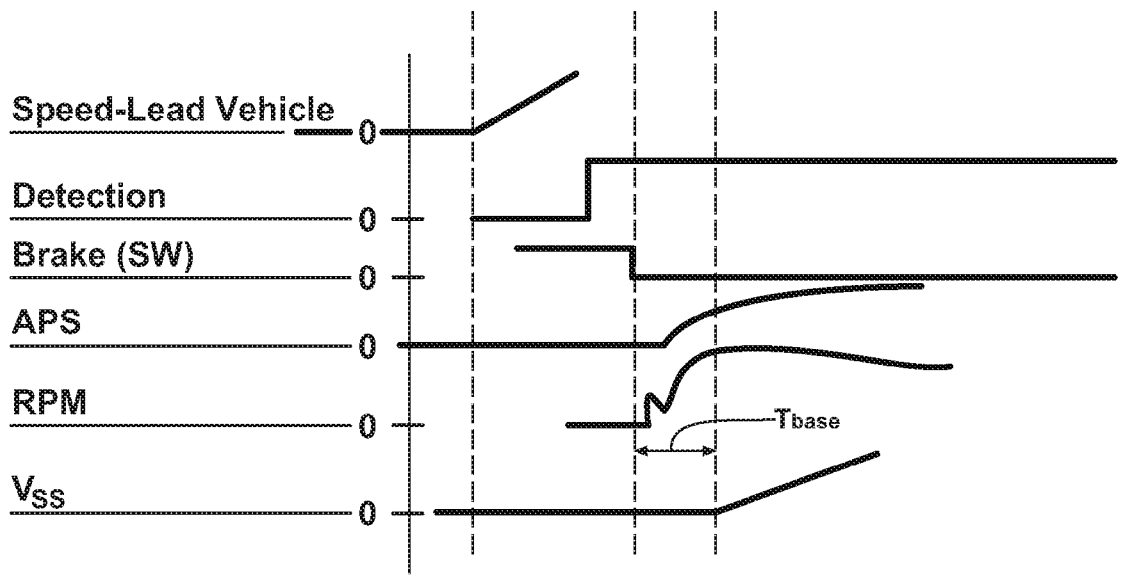
FIG. 2 is a graphical representation of data.

Referring now to the drawings, wherein the showings are for the purpose of illustrating the invention only and not for the purpose of limiting the same, FIG. 1 depicts a motor vehicle 5 and vehicle system including a control system which has been constructed in accordance with an embodiment of the present invention. The exemplary vehicle comprises an automobile or other motor vehicle operable on highway surfaces. The motor vehicle is equipped with a powertrain system comprising an internal combustion engine 16 and electronic engine control module (ECM) 10. The internal combustion engine 16 and control system are mechanized and controllable to execute engine start/stop operation during ongoing vehicle operation, in response to specific operating criteria. The vehicle 5 has several user interfaces by which a vehicle operator controls vehicle operation by providing operator control information to the vehicle control system including the ECM 10. The user interfaces typically comprise acceleration pedal position (APS), brake pedal position (BRAKE), vehicle cruise control, and other systems. Operation of the powertrain, especially the engine, is controlled by the ECM 10 in response to the operator control information. The vehicle is equipped with a forward-looking radar, ultrasound, or another range-finding device 14, and a global positioning ('GPS') device 12, each signally connected to the control system, either directly or through an on-vehicle local area network system. In alternative embodiments, the vehicle is equipped with some form of extra-vehicle communications management system 18, such as a dedicated short range communications system, or other communication system operative to communicate with other vehicles or a remote management system 60.

The vehicle control system preferably comprises a distributed integrated control system having one or more control modules operative to communicate and control various vehicle operating systems via one or more local area networks on-board the vehicle, including the ECM 10. The GPS system 12 is operable to determine vehicle driving patterns, including determination of patterns of stop-and-go traffic. In one embodiment, the control system communicates with remote management system 60 and directly with other vehicles via a wireless communications system to obtain additional information related to traffic management and other tasks. In embodiments having the extra-vehicle communications system, the short-to-medium range communications management system 18 is included in the vehicle control system. Such systems can include, by way of example, known Dedicated Short Range Communications ('DSRC') or other systems operative to execute standardized communications protocols for use in communicating between vehicles, and for use in broadcast communications with the aforementioned remote communications management system 60. The extra-vehicle communications system 18 includes on-vehicle transceiver providing wireless communications, the ECM 10 or other on-vehicle control module, and preferably a vehicle/operator interface such as a graphic user interface in the vehicle passenger compartment. Such systems can have additional functionality, including facilitating management of road systems to reduce congestion and providing logistical support to fleet managers.

The powertrain system is preferably a hybrid powertrain system comprising the engine, transmission, an electric machine comprising a motor/generator, and an electrical energy storage device. The aforementioned elements are controllable to selectively transmit torque and electrical energy therebetween, and operative to deliver tractive torque through a driveline to one or more wheels to propel the vehicle. Vehicle and powertrain operation includes generating tractive torque for transmission to the driveline, transmitting electrical energy to the electrical machine to start (and stop) the engine, transmitting electrical energy to the electrical machine to generate tractive torque, and transmitting electrical energy from the electrical machine to the electrical energy storage device.

The ECM 10 is preferably an element of the vehicle control system comprising a distributed control module architecture operative to provide coordinated control of the powertrain system and the vehicle. The powertrain system control is effective to control the engine to meet operator torque demands, including power for propulsion and operation of various accessories. The ECM synthesizes pertinent information and inputs from sensing devices (not shown), and executes control schemes to operate various actuators to achieve control targets, including such parameters as fuel economy, emissions, performance, driveability, and protection of hardware. The ECM is preferably a general-purpose digital computer generally comprising a microprocessor or central processing unit, storage media comprising read only memory (ROM), random access memory (RAM), electrically programmable read only memory (EPROM), high speed clock, analog-to-digital (A/D) and digital-to-analog (D/A) conversion circuitry, and input/output circuitry and devices (I/O) and appropriate signal conditioning and buffer circuitry. Control schemes, comprising algorithms and calibrations, are stored as machine-executable code in ROM and selectively executed. Algorithms are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms can be executed in response to occurrence of an event.

In operation of the exemplary system, the vehicle control system detects that there is an imminent opportunity to move the vehicle in a forward direction subsequent to a vehicle and engine stop event during ongoing operation, due to a change in external conditions. The change in external conditions creating the opportunity to move can be in the form of detecting a lead vehicle starting in a forward motion using the forward-looking radar, ultrasound, or other range-finding device 14, or, alternatively, in the form of a communicated signal. The communicated signal can include a communication from the lead vehicle indicating that the engine of the vehicle is started, or indicating the vehicle operator has released a brake pedal and/or depressed an accelerator pedal. The communicated signal can comprise a communication from a remote system indicating changing of a traffic control light from a 'red' light to a 'green' light.

Figure 4:
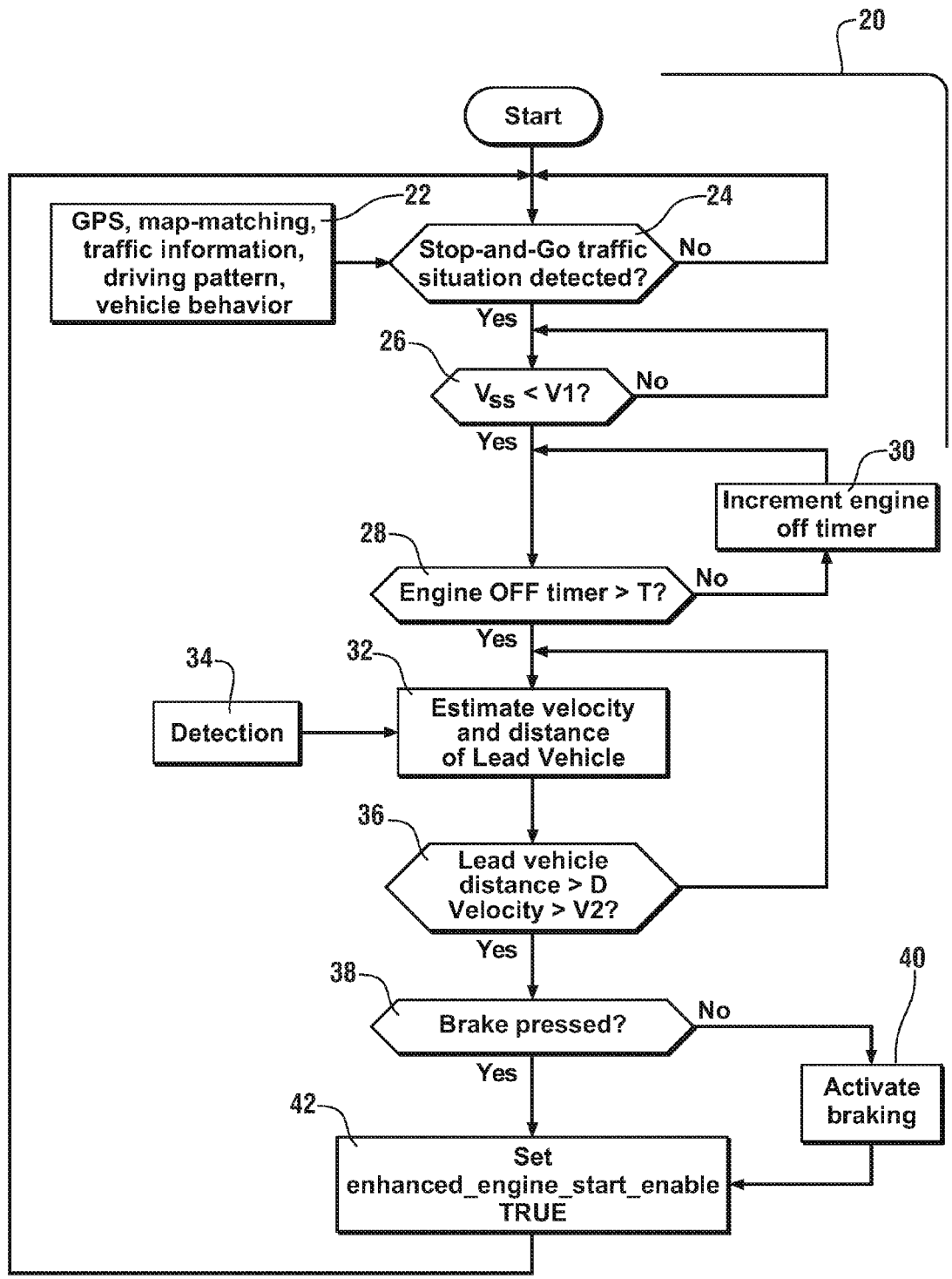

Referring now to FIG. 4, a flowchart 20 detailing operation of the exemplary system is now described. The flowchart 20 is reduced to practice as one or more algorithms converted to machine-executable code in the ECM 10 or other control module. The flowchart comprises a method to control operation of the engine 16 and powertrain to restart the engine during ongoing vehicle operation. In operation, there is a detection of an imminent opportunity to move the vehicle 5 in a forward direction, i.e., the vehicle is able to proceed from a substantially stopped position. In this system, stop-and-go traffic is detectable by monitoring information from the GPS system 12 and the forward looking device 14, and other inputs, including map-matching, traffic information, driving patterns, and vehicle behavior (Step 22). When stop-and-go traffic is detected (Step 24), vehicle speed $V_{SS}$ is monitored, to determine when it is below a threshold V1, preferably indicative of the vehicle operating substantially at zero speed (Step 26). The threshold V1 is determinable based upon vehicle system characteristics and electrical signal noise of the sensor(s) used for determining vehicle velocity. When vehicle speed is below threshold V1, an engine-off timer is monitored, to determine if engine has been off for greater than a threshold elapsed period of time, T (Step 28). When the engine has been off for an elapsed time greater than threshold T, the control system estimates velocity and distance, i.e., following range, of the lead or target vehicle (Step 32) typically using information from the vehicle forward looking sensing sensors 14 (Step 34). When the range to the lead vehicle is greater than a threshold, D, and/or velocity of the lead vehicle exceeds a threshold V2 (Step 36), the system determines whether the brake pedal is pressed (Step 38). When the brake pedal is not pressed, the control system activates braking by actuating the brake (Step 40). In either case, the system sets a flag, Enhanced_Engine_Start_Enable to TRUE in the ECM 10, and the control system subsequently restarts the internal combustion engine (Step 42).

Figure 5:
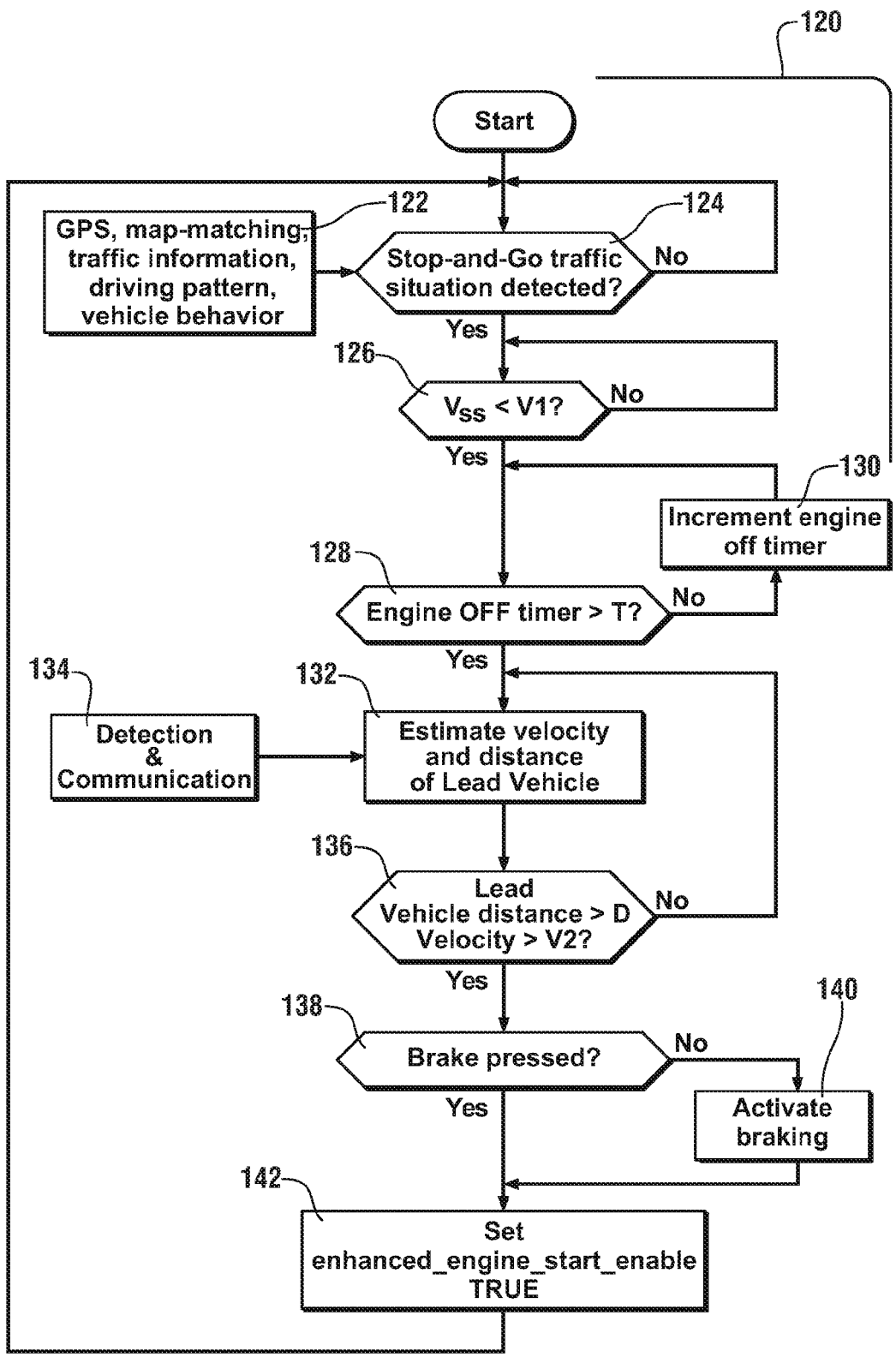

Referring now to FIG. 5, an alternate embodiment of the invention is described, wherein extra-vehicle communications are enabled. The system is controlled as follows, using flow chart 120 to describe the control scheme. The flowchart is reduced to practice as one or more algorithms converted to machine-executable code in the ECM 10 and/or other control modules. In this system, stop-and-go traffic is detectable by monitoring information from the GPS system 12, and other inputs, including map-matching, traffic information, driving patterns, and vehicle behavior (Step 122). When stop-and-go traffic is detected (Step 124), vehicle speed is monitored, to determine when it is below a threshold V1 (Step 126). The threshold is determinable based upon vehicle system characteristics and noise of the sensor(s) used for determining vehicle velocity. When vehicle speed is below threshold V1, an engine-off timer is monitored, to determine if engine has been off for greater than threshold T (Step 128). When the engine has been off for an elapsed time greater than threshold T, the control system estimates velocity and distance, i.e., following range, of the lead or target vehicle (Step 132). This detection information is obtained by direct communication with the lead vehicle (Step 134) using the aforementioned communications system, or by using information from the vehicle forward looking sensors 14. When the distance to the lead vehicle is greater than a threshold distance D, and/or velocity of the lead vehicle exceeds a threshold V2 (Step 136), the system determines whether the brake pedal is pressed (Step 138). When the brake pedal is not pressed, the control system activates braking by actuating the brake (Step 140). In either case, the system sets flag Enhanced_Engine_Start_Enable to TRUE in the control system (Step 142), and the control system subsequently restarts the internal combustion engine.

Detection and communication of the opportunity to move the vehicle forward can be determined by communicating with a local traffic infra-structure, which communicates to the vehicle a change in traffic conditions, e.g., that a traffic light is changing, thus enabling activation of the vehicle engine as described.

Further enhancements are possible in vehicles equipped with visual imaging systems, such as on-board camera systems. In such circumstances, the on-board camera system can detect change in a traffic light from a 'stop' (red) signal to a 'go' (green) signal. Such a system can determine release of brakes on the lead vehicle by monitoring brake light illumination. Such a system can detect movement of the lead vehicle.

Figure 3:
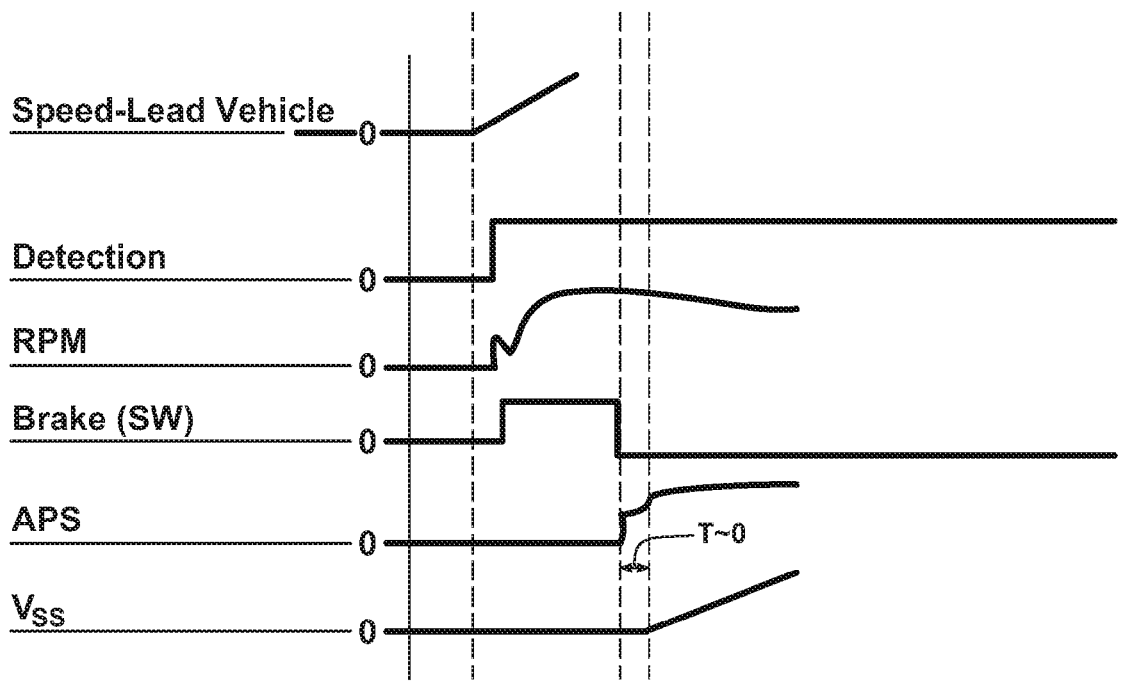
FIG. 3 is a graphical representation of data, in accordance with the present invention; and, FIGS. 4 and 5 are algorithmic flowcharts, in accordance with the present invention.

Referring now to FIG. 3, operation of the vehicle system described with reference to FIGS. 4 and 5 is now detailed. FIG. 3 depicts elapsed time on the horizontal axis. Initially the engine speed RPM is zero, and vehicle speed $V_{SS}$ is substantially zero, and the brake switch BRAKE, is zero, i.e., no brake is applied. The lead vehicle is typically operating at zero speed. At a point in time, the speed of the lead vehicle increases above a threshold. The increase in speed of the lead vehicle is detected by the forward-looking device 14 of the vehicle 5, thus triggering the DETECTION signal. The engine 16 is started by the ECM 10, consistent with execution of either of the control schemes described with reference to FIGS. 4 and 5. The brake is applied (BRAKE), and vehicle speed $V_{SS}$ remains zero and the accelerator pedal (APS) is unchanged. As depicted, manipulation of the accelerator pedal APS by the operator results in a substantially immediate response by the vehicle, which leads to the vehicle moving in a forward direction, i.e., $V_{SS}$ increases.

The method and system described herein are effective to improve responsiveness of a vehicle equipped with an engine start/stop system. The exemplary algorithm executed in the control system for controlling the engine 16 and vehicle 5 comprises a method to start the engine after an induced stop of the engine. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling a vehicle during ongoing operation subsequent to deactivating an internal combustion engine, comprising:
    operating the vehicle upon a roadway with the engine deactivated;
    within a control module, monitoring conditions external to the vehicle, the monitoring comprising:
        within the control module, monitoring operation of the vehicle upon the roadway;
        within the control module, monitoring speed of the vehicle;
        within the control module, determining a velocity of a lead vehicle based upon the monitored conditions external to the vehicle; and
        within the control module, determining a range to the lead vehicle based upon the monitored conditions external to the vehicle; and
    when the monitored conditions external to the vehicle indicate an imminent opportunity to move the vehicle in a forward direction, generating a command within the control module to restart the engine.

2. System for control of an internal combustion engine of a vehicle, the system comprising:
    the engine;
    an engine starting device; and
    a control module comprising:
        a data storage device; and
        a microprocessor communicating with the data storage device; and
    wherein the control module is configured to:
        monitor conditions external to the vehicle, comprising:
            monitoring vehicle operation upon a roadway;
            monitoring speed of the vehicle; and
            monitoring elapsed time of engine stop;
        estimate a velocity of a lead vehicle based upon the conditions external to the vehicle;
        estimate a range to the lead vehicle based upon the conditions external to the vehicle; and
        command a restart of the engine when the estimated velocity and range to the lead vehicle each exceed thresholds, the vehicle speed is less than a threshold, and the elapsed time of engine stop exceeds a threshold.

3. The system of claim 2, wherein the control module is further configured to actuate vehicle braking prior to commanding the engine to restart.

4. The method of claim 1, wherein the monitored external conditions indicating an imminent opportunity to move the vehicle in a forward direction comprise the range to the lead vehicle exceeding a range threshold and forward velocity of the lead vehicle exceeding a velocity threshold.

5. The method of claim 1, wherein monitoring conditions external to the vehicle further comprises communicating with a lead vehicle to determine operating conditions of the lead vehicle.

6. The method of claim 5, wherein communicating with the lead vehicle to determine operating conditions of the lead vehicle comprises determining the lead vehicle has exceeded one of a range threshold and a velocity threshold.

7. The method of claim 1, wherein monitoring conditions external to the vehicle further comprises communicating through a wireless communications system with an external traffic management system describing traffic upon the roadway.

8. The method of claim 7, further comprising communicating with the external traffic management system determining operation of a lead vehicle.

9. The method of claim 7, further comprising communicating with the external traffic management system determining an operating condition of a traffic control device.

10. The method of claim 1, wherein monitoring conditions external to the vehicle further comprises monitoring a traffic control device.

11. The method of claim 1, further comprising actuating vehicle braking prior to restarting the internal combustion engine.

12. The method of claim 1, further comprising:
    monitoring a time that the engine has been deactivated;
    comparing the time that the engine has been deactivated to a threshold elapsed period of time; and
    enabling restarting the internal combustion engine based upon the time that the engine has been deactivated being greater than the threshold elapsed period of time.

13. Method for controlling a vehicle during ongoing operation, comprising:

operating the vehicle upon a roadway with an internal combustion engine deactivated;
within a control module, monitoring conditions external to the vehicle, the monitoring comprising:
- within the control module, monitoring vehicle operation upon the roadway;
- within the control module, monitoring speed of the vehicle;
- within the control module, determining a velocity of a lead vehicle based upon the monitored conditions external to the vehicle; and
- within the control module, determining a range to the lead vehicle based upon the monitored conditions external to the vehicle;

through commands generated within the control module, actuating the internal combustion engine when the monitored conditions external to the vehicle indicate an imminent opportunity to propel the vehicle; and,
actuating vehicle braking prior to enabling actuation of the internal combustion engine.

14. Method for controlling a vehicle during ongoing operation, comprising:
operating the vehicle upon a roadway with a propulsion system deactivated;
within a control module, monitoring conditions external to the vehicle, the monitoring comprising:
- within the control module, monitoring vehicle operation upon the roadway;
- within the control module, monitoring speed of the vehicle;
- within the control module, estimating a velocity of a lead vehicle based upon the monitored conditions external to the vehicle; and
- within the control module, estimating a range to the lead vehicle based upon the monitored conditions external to the vehicle;

through commands generated within the control module, actuating the propulsion system when the monitored conditions external to the vehicle indicate an imminent opportunity to propel the vehicle; and,
actuating vehicle braking prior to enabling actuation of the propulsion system.

15. The method of claim 13, wherein the monitored external conditions indicating an imminent opportunity to move the vehicle in a forward direction comprise one of the range to the lead vehicle exceeding a range threshold and forward velocity of the lead vehicle exceeding a velocity threshold.

16. The method of claim 14, wherein the monitored external conditions indicating an imminent opportunity to move the vehicle in a forward direction comprise one of the range to the lead vehicle exceeding a range threshold and forward velocity of the lead vehicle exceeding a velocity threshold.

17. The method of claim 16, further comprising:
monitoring a time that the engine has been deactivated;
comparing the time that the engine has been deactivated to a threshold elapsed period of time; and
enabling actuation of the propulsion system based upon the time that the engine has been deactivated being greater than the threshold elapsed period of time.

18. The method of claim 15, further comprising:
monitoring a time that the internal combustion engine has been deactivated;
comparing the time that the internal combustion engine has been deactivated to a threshold elapsed period of time; and
enabling actuation of the internal combustion engine based upon the time that the internal combustion engine has been deactivated being greater than the threshold elapsed period of time.

* * * * *